(12) United States Patent
Huang et al.

(10) Patent No.: US 8,912,415 B2
(45) Date of Patent: Dec. 16, 2014

(54) ACOUSTIC STRUCTURE FIDDLE AND MANUFACTURING METHOD THEREOF

(76) Inventors: Xiaozhen Huang, Chengdu (CN); Lingyun Hou, Xian (CN); Shizhen Yang, Xian (CN)

( * ) Notice: Subject to any disclaimer, the term of this patent is extended or adjusted under 35 U.S.C. 154(b) by 125 days.

(21) Appl. No.: 13/698,630

(22) PCT Filed: Oct. 11, 2011

(86) PCT No.: PCT/CN2011/080622
§ 371 (c)(1),
(2), (4) Date: Nov. 16, 2012

(87) PCT Pub. No.: WO2012/071946
PCT Pub. Date: Jun. 7, 2012

(65) Prior Publication Data
US 2013/0055875 A1    Mar. 7, 2013

(30) Foreign Application Priority Data

Dec. 1, 2010 (CN) .......................... 2010 1 0566979

(51) Int. Cl.
*G10D 1/02* (2006.01)
*G01D 3/02* (2006.01)

(52) U.S. Cl.
CPC ... *G10D 1/02* (2013.01); *G01D 3/02* (2013.01)
USPC .............................................. 84/274; 84/275

(58) Field of Classification Search
USPC ........................................................... 84/274
See application file for complete search history.

(56) References Cited

U.S. PATENT DOCUMENTS

| 496,397 | A | * | 5/1893 | Clopton | 84/294 |
| 3,136,196 | A | * | 6/1964 | Charlesworth | 84/275 |
| 3,487,740 | A | * | 1/1970 | Tansky | 84/276 |
| 3,678,794 | A | * | 7/1972 | Tansky | 84/275 |
| 3,680,424 | A |   | 8/1972 | Delu | |
| 3,691,891 | A | * | 9/1972 | Delu | 84/275 |

(Continued)

FOREIGN PATENT DOCUMENTS

| CN | 1312538 A | 9/2001 |
| CN | 2636356 Y | 8/2004 |

OTHER PUBLICATIONS

International Search Report; International Application No. PCT/CN2011/080622; Dated Oct. 11, 2011; 8 pages total; International Searching Authority / State Intellectual Property Office of P.R.C., People's Republic of China.

(Continued)

*Primary Examiner* — Christopher Uhlir
(74) *Attorney, Agent, or Firm* — Andrew D. Fortney; Central California IP Group, P.C.

(57) ABSTRACT

The present invention relates to a violin of acoustic configuration, which is different from the classic violin and a manufacturing method thereof. The violin of acoustic configuration is produced according to the rules of acoustic regularity, standard pitch data and uniform orderly reflecting surface of the violin cavity. The reflecting surface of cavity is depended on the international standard pitch data and the rule of acoustic wavelength changing. According to the configuration rules, the violin made of normal materials and technology process condition may provide better volume and tone, and provide much better performance in the standard pitch playing status.

20 Claims, 6 Drawing Sheets

(56) References Cited

U.S. PATENT DOCUMENTS

| | | | | |
|---|---|---|---|---|
| 3,981,219 A * | 9/1976 | Johns | | 84/275 |
| 4,325,279 A * | 4/1982 | Lower | | 84/275 |
| 4,941,383 A * | 7/1990 | Hogue | | 84/275 |
| 5,841,047 A * | 11/1998 | Mandreck | | 84/274 |
| 5,955,688 A * | 9/1999 | Cook | | 84/291 |
| 6,610,915 B2 * | 8/2003 | Schleske | | 84/291 |
| 7,301,085 B2 * | 11/2007 | Wyman | | 84/291 |

OTHER PUBLICATIONS

Tingyan Wang; "Violin with Back and Side Boards Made of Coconut Shell"; Espacenet; Chinese Publication No: CN2636356 (Y); Publication Date: Aug. 25, 2004; 2 pages; Espacenet Database; http://worldwide.espacenet.com.

Xin Chen, Yi Chen and Ze Chen; "Acoustical Resonator Cavity with High Acoustical Quality for Music Instrument"; Espacenet; Chinese Publication No. CN13125338 (A); Publication Date: Sep. 12, 2001; Espacenet Database; http://worldwide.espacenet.com.

* cited by examiner

ACOUSTIC STRUCTURE FIDDLE AND MANUFACTURING METHOD THEREOF

FIELD OF THE INVENTION

The present invention relates to the field of violin configuration improvement and manufacturing method thereof. The violin according to the invention includes fiddle, viola and cello.

BACKGROUND

Figure 1:
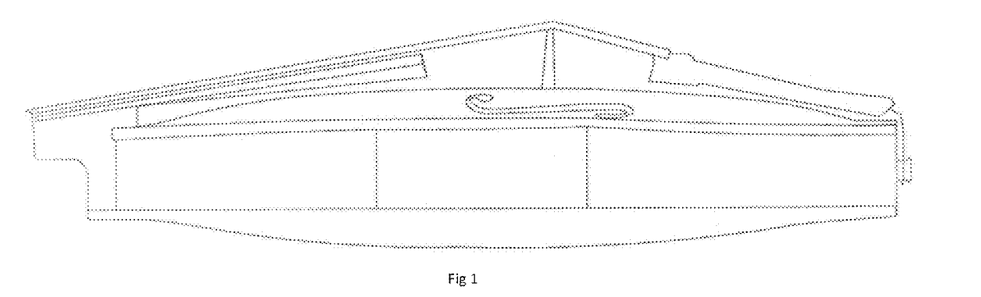
FIG. 1 is a classical violin. Looking from the exterior, the longitudinal curve of the faceplate and the backplate rising process is short, so that the spacing reaches a maximum value soon.

Today's violin follows the configuration of the ancient Italy famous artisan, it has been more than three hundred years. The classical configuration of violin is shown in FIG. 1.

The traditional violin comprise a head end, strings, codes, sound columns, a bass beam, a fingerboard, a faceplate, a backplate, side plates, first wood, tail wood, angle wood and bow. The violin imitated the traditional violin is not satisfied with the volume and tone usually.

In order to improve the timbre and volume of the violin, people improve each part of the violin. The cavity of the violin is the mainly part, which produces sound and resonance, improvement of the configuration of the cavity will directly influence the volume and timbre of the violin.

AntonioStradivari, famous violin maker, almost take his whole life (from 1690 to 1713) to change his works to pursuit the best violin shape.

Violin is a sound generator and resonant box. The oscillation of the sound in the cavity is completed by the sound wave reflected up and down by the reflecting surface of the faceplate and the backplate. In order to create harmonious oscillation, the reflecting surface should be elastic, uniform, smooth and continues. Each kind of sound has particular requirement for the reflecting surface position, area distribution and relative distance. It is closely related to the inner surface of the faceplate and the backplate. For making the best violin, a reasonable scientific configuration is very important.

SUMMARY OF THE INVENTION

The present invention is to provide a more reasonable scientific configuration for the violin and manufacture method thereof.

The technical proposal of the invention is as follows,

An acoustic configuration violin, comprising a backplate, a faceplate and side plates, which constitute the violin cavity, one end of the cavity being the head end and the other end being the tail end, the side of the cavity having a c-shaped region, f-hole being set on the faceplate, wherein, In the longitudinal mid-section of violin cavity head end and tail end, the vertical distance between the inner surface of the backplate and the faceplate is increased gradually from the head end or the tail end to the location of c-shaped region, and farther from the C-shaped region, the rising slope of the vertical distance is smaller, nearer from the C-shaped region, the rising slope of the vertical distance is greater.

The preferably embodiments of the invention are as follows:

Preferably, the length between the head end to c-shaped region being divided in twelve equal parts, the distance between the backplate inner surface and faceplate inner surface at each divided point are as follows, choosing 12 tones in order from the united states of America standard institute z 24.1-1936 standard pitch frequency table, said 12 tones being according to the 12 divided points respectively, the wavelengths of each tones is equal to the distance between the faceplate inner surface and the backplate inner surface; the length between the tail end to c-shaped region is divided in twelve equal parts, the distance between the backplate inner surface and faceplate inner surface at each divided point are as follows, choosing 12 tones in order from the united states of America standard institute z 24.1-1936 standard pitch frequency table, said 12 tones being according to the 12 divided points respectively, the wavelengths of each tones is equal to the distance between the faceplate inner surface and the backplate inner surface.

Preferably, said violin is fiddle.

Preferably, said violin is viola or cello.

Preferably, twelve tones choosing for the head end to c-shaped region are different form twelve tones choosing for the tail end to c-shaped region.

Preferably, a low frequency reflecting surface is set in the violin cavity, the low frequency reflecting surface located in the central of cavity and avoid the f hole, and the distance between inner faceplate and the low frequency reflecting surface is less than 0.4 cm. Said low frequency reflecting surface can improve the low frequency reflecting effect of sound. For example, according to the fiddle G string, G35 wavelength being 1140.419 mm, it can be reflected only at its 1/32 wavelength, so that the oscillations energy loss is large. After setting the low frequency reflecting surface, the reflecting surface is at approximate zero wavelength of the sound wave, and has a good effect for reflecting low frequency sound wave.

Preferably, aid low frequency reflecting surface is set at the inner side of the violin bass beam.

A method for making the above mentioned violin of acoustic configuration comprises the following steps of, in the longitudinally symmetrical section between the head end and tail end in the violin cavity, dividing the length between the head end to the c shaped region into 12 equal parts, choosing 12 standard tones wavelength in order from the united states of America standard institute z 24.1-1936 standard pitch frequency table, said 12 standard tones wavelength according to the 12 divided points respectively, said 12 standard tones wavelength being equal to the distance between faceplate inner surface and backplate inner surface, connecting twelve points with a continuous curve to constitute a violin cavity inner mold line, dividing the length between the tail end to the c shaped region into 12 equal parts, choosing 12 standard tones wavelength in order from the united states of America standard institute z 24.1-1936 standard pitch frequency table, said 12 standard tones wavelength according to the 12 divided points respectively, said 12 standard tones wavelength is equal to the distance between faceplate inner surface and backplate inner surface, connecting twelve points with a continuous curve to constitute a violin cavity inner mold line.

Preferably, at the two ends of the violin cavity, set the twelfth dividing point, most closest to the c-shape region, as the origin point. Setup the vertical axis, which is through longitudinal symmetrical section and the origin as rotating axis, (the datum plane of the faceplate and the backplate is the Horizon of Newton reference system, the direction of its perpendicular line and vertical axis is the same as the direction of freefall), according to said rotating axis, intercepts equal radial sections at different inclination angle, and at all vertical dividing line of the longitudinal symmetrical section and equal radial sections, makes the vertical distance at these points between inner surface equal to wavelength of selected 12 tone respectively, and obtains smooth and continuous surface.

In the technical scheme said above, the invention is according to the rules of acoustics and American music standards institute z24.1-1936 standard pith frequency data, calculated the acoustic wavelength, the specific frequency and wavelength are as follows, American music standards institute
Z24.1-1936

TABLE 1

American music standards institute Z24.1 ---- 1936 standard pith frequency table

| Sound name | Key No. | Frequency (Hz) | Key No. | Frequency (Hz) | Key No. | Frequency (Hz) | Key No. | Frequency (Hz) | Key No. | Frequency (Hz) | Key No. | Frequency (Hz) | Key No. | Frequency (Hz) | Key No. | Frequency (Hz) |
|---|---|---|---|---|---|---|---|---|---|---|---|---|---|---|---|---|
| A | 1 | 27.500 | 13 | 55.000 | 25 | 110.000 | 37 | 220.000 | 49 | 440.000 | 61 | 880.000 | 73 | 1760.000 | 85 | 3520.000 |
| #A($^b$B) | 2 | 29.135 | 14 | 58.270 | 26 | 116.541 | 38 | 233.082 | 50 | 446.164 | 62 | 932.328 | 74 | 1864.655 | 86 | 3729.310 |
| B | 3 | 30.868 | 15 | 61.735 | 27 | 123.471 | 39 | 246.942 | 51 | 493.883 | 63 | 987.767 | 75 | 1975.533 | 87 | 3951.066 |
| C | 4 | 32.703 | 16 | 65.406 | 28 | 130.831 | 40 | 261.626 | 52 | 523.251 | 64 | 1046.502 | 76 | 2093.005 | 88 | 4188.009 |
| #C($^b$D) | 5 | 34.648 | 17 | 69.296 | 29 | 138.591 | 41 | 277.183 | 53 | 554.365 | 65 | 1108.731 | 77 | 2217.461 | | |
| D | 6 | 36.708 | 18 | 73.416 | 30 | 146.832 | 42 | 293.665 | 54 | 587.330 | 66 | 1174.659 | 78 | 2349.318 | | |
| #D($^b$E) | 7 | 38.891 | 19 | 77.782 | 31 | 155.563 | 43 | 311.127 | 55 | 622.254 | 67 | 1244.508 | 79 | 2489.016 | | |
| E | 8 | 41.203 | 20 | 82.407 | 32 | 164.814 | 44 | 329.628 | 56 | 659.255 | 68 | 1318.510 | 80 | 2637.021 | | |
| F | 9 | 43.654 | 21 | 87.307 | 33 | 174.614 | 45 | 349.228 | 57 | 698.456 | 69 | 1396.913 | 81 | 2793.826 | | |
| #F($^b$G) | 10 | 46.249 | 22 | 92.499 | 34 | 184.997 | 46 | 369.994 | 58 | 739.989 | 70 | 1479.978 | 82 | 2959.955 | | |
| G | 11 | 48.899 | 23 | 97.999 | 35 | 195.998 | 47 | 391.995 | 59 | 783.991 | 71 | 1567.982 | 83 | 3135.964 | | |
| #G($^b$A) | 12 | 51.913 | 24 | 103.826 | 36 | 207.652 | 48 | 415.305 | 60 | 830.609 | 72 | 1661.219 | 84 | 3322.438 | | |

In the above mentioned table, 12 tones of per octave (including semitone) are one group, the frequency of the later group is exactly double the previous group. Due to the speed of sound in the air is known, we calculate the wavelength for each tone based on the frequency.

reflecting surface, the low frequency reflecting surface, which is mounted at the side of bass beam keeps a closer distance with the inner faceplate surface, so that it can decrease the bass loss, and enhance the volume and timbre by reflecting the bass in a very short distance.

TABLE 2

Calculated wavelength table of each violin tone

| Sound name | Key No. | Wavelength (mm) | Key No. | Wavelength (mm) | Key No. | Wavelength (mm) | Key No. | Wavelength (mm) | Key No. | Wavelength (mm) | Key No. | Wavelength (mm) | Key No. | Wavelength (mm) | Key No. | Wavelength (mm) |
|---|---|---|---|---|---|---|---|---|---|---|---|---|---|---|---|---|
| A | 25 | 2032.000 | 37 | 1016.000 | 49 | 508.000 | 61 | 254.000 | 73 | 127.000 | 85 | 63.500 | 97 | 31.750 | 109 | 15.875 |
| #A($^b$B) | 26 | 1917.925 | 38 | 958.975 | 50 | 479.488 | 62 | 239.744 | 74 | 119.872 | 86 | 59.936 | 98 | 29.968 | 110 | 14.984 |
| B | 27 | 1810.304 | 39 | 905.151 | 51 | 452.577 | 63 | 226.288 | 75 | 113.144 | 87 | 56.572 | 99 | 28.286 | 111 | 14.143 |
| C | 28 | 1708.698 | 40 | 854.349 | 52 | 427.175 | 64 | 213.588 | 76 | 109.622 | 88 | 53.397 | 100 | 26.698 | 112 | 13.349 |
| #C($^b$D) | 29 | 1612.803 | 41 | 806.398 | 53 | 403.200 | 65 | 201.600 | 77 | 100.800 | 89 | 50.400 | 101 | 25.200 | 113 | 12.600 |
| D | 30 | 1522.284 | 42 | 761.139 | 54 | 380.570 | 66 | 190.285 | 78 | 95.143 | 90 | 47.775 | 102 | 23.887 | 114 | 11.943 |
| #D($^b$E) | 31 | 1436.845 | 43 | 718.420 | 55 | 359.210 | 67 | 179.605 | 79 | 89.803 | 91 | 44.901 | 103 | 22.450 | 115 | 11.225 |
| E | 32 | 1356.195 | 44 | 678.098 | 56 | 330.049 | 68 | 169.528 | 80 | 84.762 | 92 | 42.381 | 104 | 21.190 | 116 | 10.595 |
| F | 33 | 1280.080 | 45 | 640.040 | 57 | 320.020 | 69 | 160.010 | 81 | 80.005 | 93 | 40.002 | 105 | 20.001 | 117 | 10.001 |
| #F($^b$G) | 34 | 1208.236 | 46 | 604.118 | 58 | 302.059 | 70 | 151.029 | 82 | 75.515 | 94 | 37.757 | 106 | 18.878 | 118 | 9.439 |
| G | 35 | 1140.419 | 47 | 570.211 | 59 | 285.105 | 71 | 142.553 | 83 | 71.276 | 95 | 35.387 | 107 | 17.693 | 119 | 8.847 |
| #G($^b$A) | 36 | 1076.416 | 48 | 538.207 | 60 | 269.104 | 72 | 134.552 | 84 | 67.276 | 96 | 33.638 | 108 | 16.819 | 120 | 8.410 |

The wavelength in the table 2 is as same as the frequency, twelve tones are one group, and the latter group is ½ times to the former group. Any group we picked out can represent the variation rule of any other group. The particular wavelength of each group is different. The wavelength can be several meters in the bass, but the wavelength is only a few millimeters in the treble area. Depending on the size of violin, the wavelength data can be selected to match the size of violin.

The invention has the following advantages, the inner sound reflecting surface of the violin reflects acoustic wavelength variation rule, which the rule of the reflecting surface is defined by the international standard pitch data. For the uniform and orderly reflecting surface, the sound information loss probability is reduced, and makes excellent resonant effect. The timbre are full and soft, treble are brighter, and bass are thick. The requirement of material is lowered. Further more, in some embodiment that use low frequency

BRIEF DESCRIPTION OF THE DRAWINGS

The invention is described through examples and accompanying drawings, wherein.

EMBODIMENTS

Example of the invention is acoustic configuration fiddle, the fiddle traditional height of head wood and tail wood is 30.5 mm and 32.5 mm. As a reference in the production of acoustic configuration fiddle, we are from table 2 select two set data as follow.

| | Sound name: | | | | | | | | | | | |
|---|---|---|---|---|---|---|---|---|---|---|---|---|
| | $^\#A_{98}$ | $A_{97}$ | $^\#G_{96}$ | $G_{95}$ | $^\#F_{94}$ | $F_{93}$ | $E_{92}$ | $^\#D_{91}$ | $D_{90}$ | $^\#C_{89}$ | $C_{88}$ | $B_{87}$ |
| Wavelength: (mm) | 29.968 | 31.750 | 33.638 | 35.387 | 37.757 | 40.002 | 42.381 | 44.901 | 47.775 | 50.400 | 53.397 | 56.572 |

| | Sound name: | | | | | | | | | | | |
|---|---|---|---|---|---|---|---|---|---|---|---|---|
| | $A_{97}$ | $^\#G_{96}$ | $G_{95}$ | $^\#F_{94}$ | $F_{93}$ | $E_{92}$ | $^\#D_{91}$ | $D_{90}$ | $^\#C_{89}$ | $C_{88}$ | $B_{87}$ | $^\#A_{86}$ |
| Wavelength: (mm) | 31.750 | 33.638 | 35.387 | 37.757 | 40.002 | 42.381 | 44.901 | 47.775 | 50.400 | 53.397 | 56.572 | 59.936 |

The two groups of sound we called design element

All music of the fiddle including chromatic have 3 groups and half, which add up to 41. Because the fiddle entity is small, we can only select the table in wavelengths smaller group, as the design element for design. in order to reduce the energy loss of sound oscillation, we should make the spacing between faceplate and backplate equal to design data, in same time, according to the uniform and orderly rule, to decide trend of the faceplate and backplate.

Figure 2:
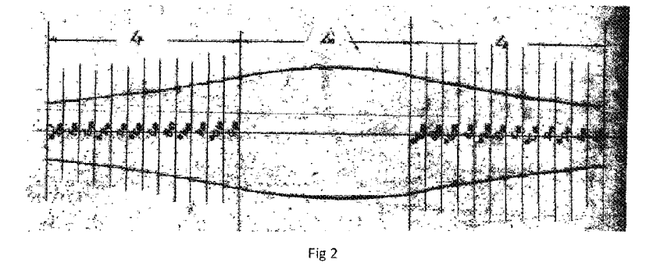
FIG. 2 is a faceplate and backplate surface trend graph of the fiddle according to the embodiment of the invention, i.e. the longitude of the fiddle according to the wavelength changes rule of acoustic configuration getting from the international standard pitch data and uniform orderly rule.

Let Ip, Im and Ib express length of fiddle head, middle and tail {on the principle of c shaped area as the central, other is the front and aft}. The head part and the tail part evenly divided into twelve equal part. Then make twelve rectangles, rectangular high respectively equal to the twelve wavelength data. connected rectangular vertex we can obtain longitudinal trend graph of wavelength change rule, shown in FIG. 2, we use on same method can obtain miscellaneous trend graph. In the longitudinal plane the cavity ends the twelfth point become the origin {the origin point is leave to the c-shaped region closely and the wavelength is maximum}, we can through the origin set up vertical axis for rotating axis, this rotating axis is perpendicular to datum of faceplate and back plate, rotate the axis and intercept radiation planes with different inclination angles relative to longitudinal symmetrical plane, along each radiation plane make twelve equaled vertical line, every line its distance between the inner surface of faceplate and backplate corresponding equal to the twelve wavelengths, thus formation an acoustic continuous curved inner surface of fiddle, in all points of the faceplate and backplate, the vertical distance between the inner surface is gradually increased. The distance to the origin point is far, the vertical rise slope is smaller; the distance to the origin point is closer, the vertical rise slope is greater.

Then, the height of side board, first wood, end wood and angle wood should be regulated by the design elements data.

Figure 3:
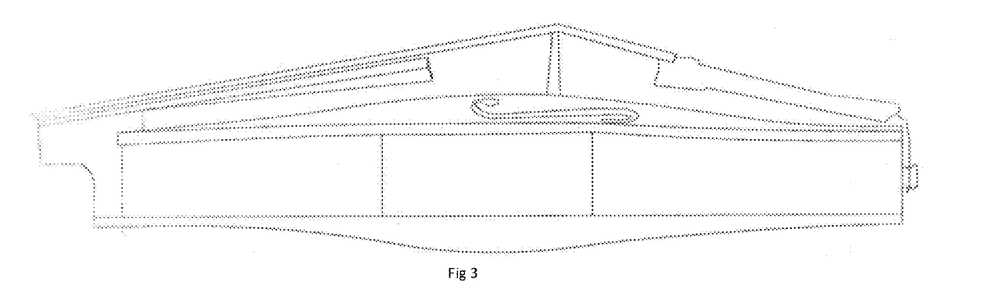
FIG. 3 is a configuration drawing of the acoustic configuration fiddle, which is according to the wavelength change rule getting from the international standard pitch data and uniform orderly rule. Looking from the exterior, the vertical spacing chande between faceplate and backplate is slowly monotonically increasing along the longitudinal direction, this trend has continued to the c shaped area until the end near.

The acoustic configuration fiddle formed of fiddle cavity, which is composed of acoustic configuration faceplate, back plate, side board, first wood block, angle wood block and tail wood block, as shown in FIG. 3.

This acoustic configuration cavity is characterized that;

1, violin configuration elements and relationships are determined by the acoustic data.

2, it can choose different or the same two groups of twelve design elements matching the various size of violin.

3, the acoustic reflecting surfaces is reflect change rule of acoustic wavelength.

4, the reflecting surface formed uniformly and orderly can make the sound more harmonious.

5, look from the exterior, the faceplate and backplate [or one of them] have different shape trend comparison with traditional violin, the feature for inner curved trend along the longitudinal direction, the height is a slow monotone increasing trend, this trend has continued go to nearly the c-shaped region.

The fiddle can use in general material and technology condition to make the fiddle in the standard pitch conditions, voice is soft and rich colors, bright treble, and bass thick, and pronunciation homogeneous, sensitive response.

In addition to further know different effect of two different configurations and exclusion influence of material and technology process, we used the same violin and two kinds of configuration for comparison and evaluation.

A is a violin selection secondary material according to the Antonio.stradivari configuration classical violin.

B is based on A only replace the faceplate, new faceplate of inner surface is formation by acoustic data and based on backplate inner surface. B represents the acoustic configuration violin, The spectrum recording is A type and B type records.

FIG. 6 to FIG. 37 spectrum is A type and B type in E, A, D, G string of empty string sound, each empty string has four sampling record.

Comparison the result shown that, B type violin sound spectrum was superior to A type violin.

Figure 4:
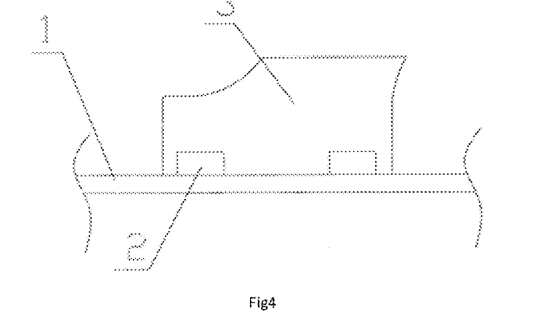
FIG. 4 is the sketch diagram of low frequency reflection board.
Figure 5:
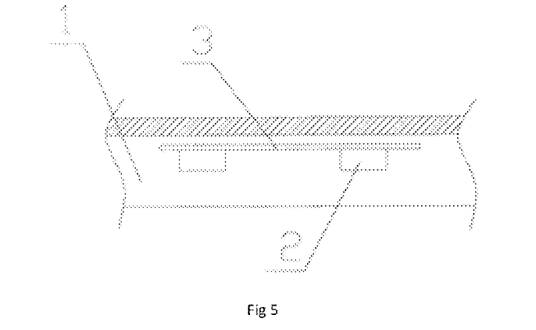
FIG. 5 is the top view of low frequency reflection board shown in FIG. 4.
Figure 6:
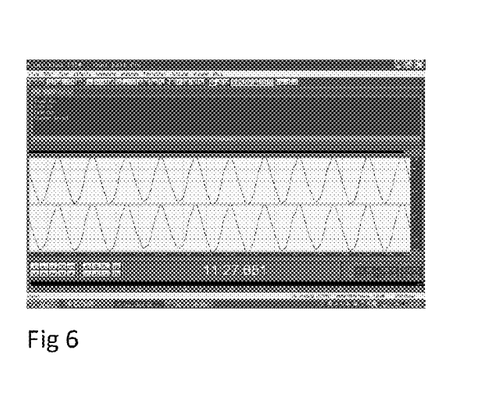
FIG. 6 to FIG. 9 is E string frequency spectrum of A type.
Figure 7:
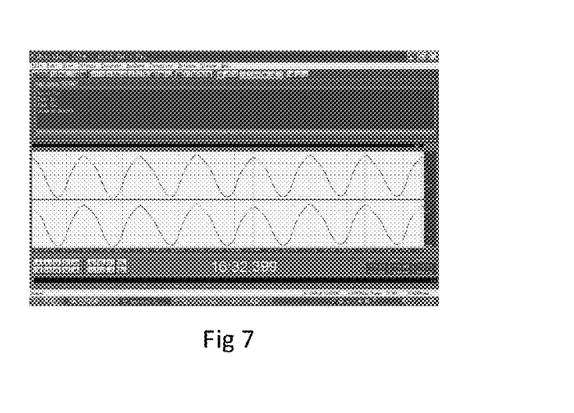
Figure 8:
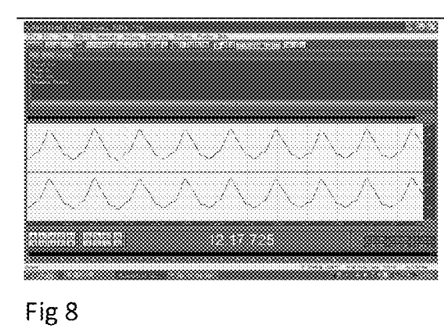
Figure 9:
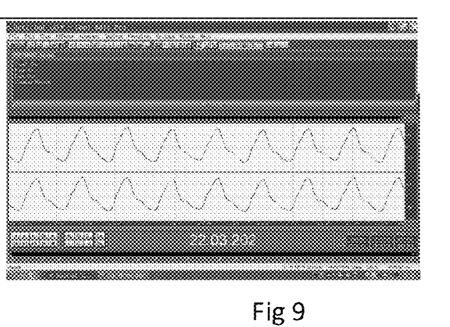
Figure 10:
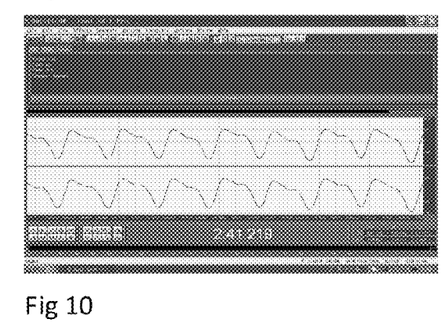
FIG. 10 to FIG. 13 is E string frequency spectrum of B type.
Figure 11:
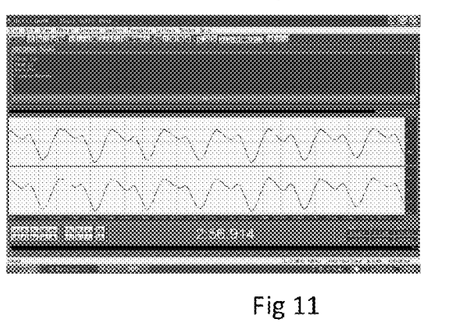
Figure 12:
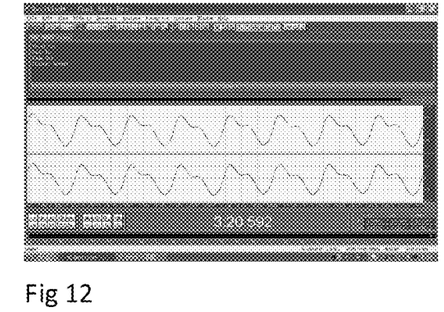
Figure 13:
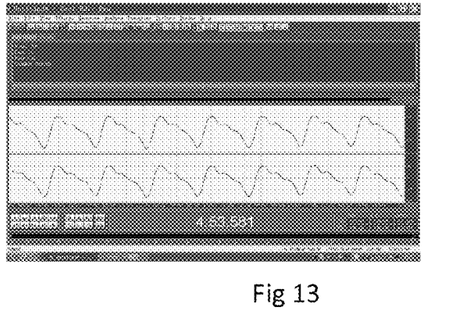
Figure 14:
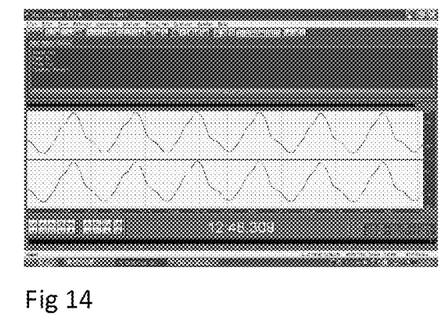
FIG. 14 to FIG. 17 is A string frequency spectrum of A type.
Figure 15:
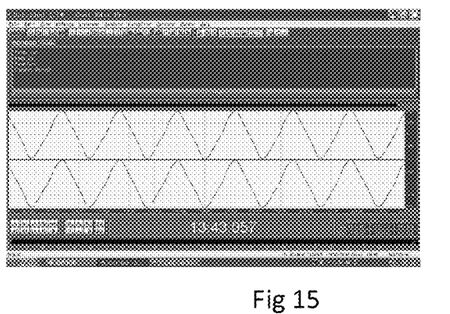
Figure 16:
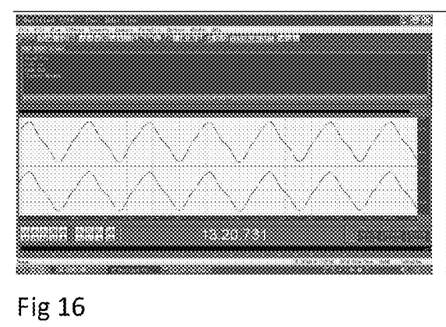
Figure 17:
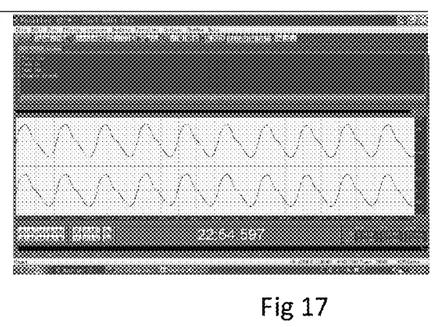
Figure 18:
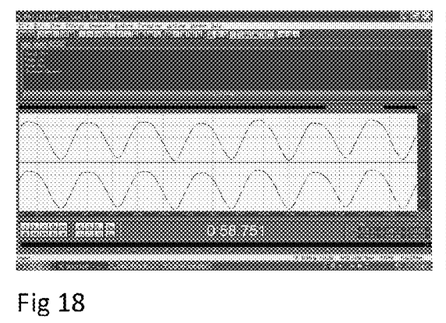
FIG. 18 to FIG. 21 is A string frequency spectrum of B type.
Figure 19:
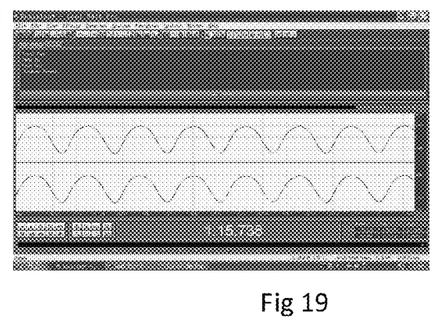
Figure 20:
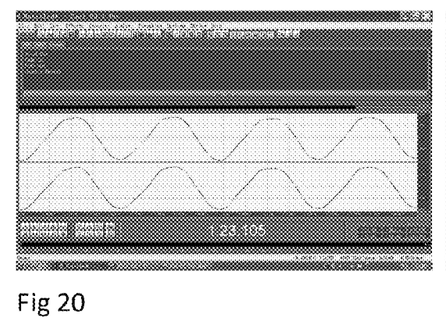
Figure 21:
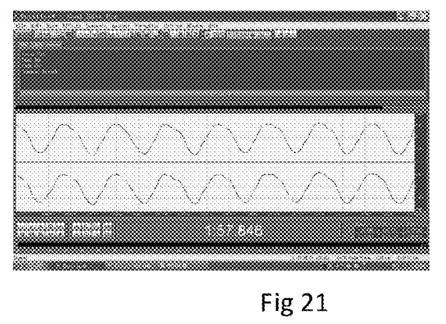
Figure 22:
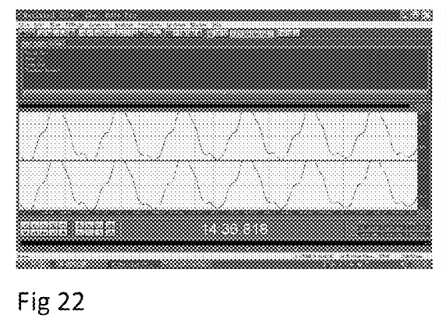
FIG. 22 to FIG. 25 is D string frequency spectrum of A type.
Figure 23:
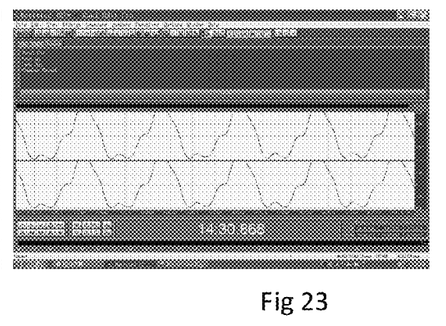
Figure 24:
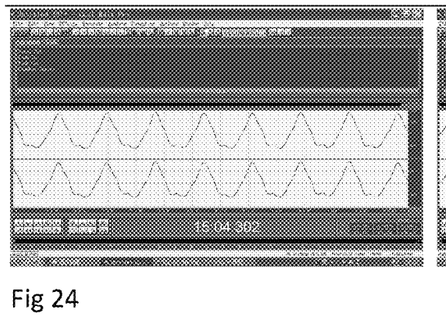
Figure 25:
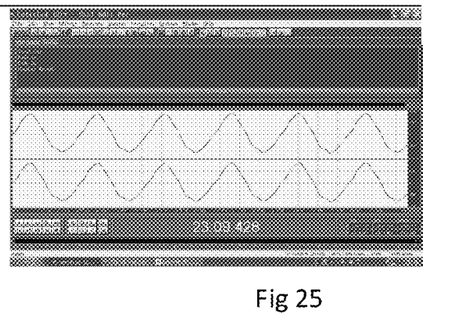
Figure 26:
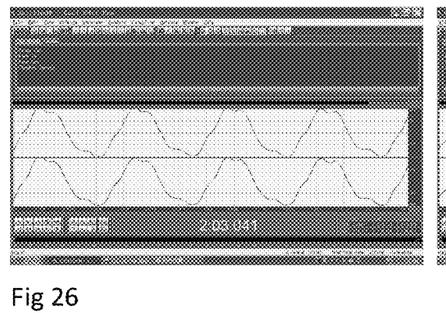
FIG. 26 to FIG. 29 is D string frequency spectrum of B type.
Figure 27:
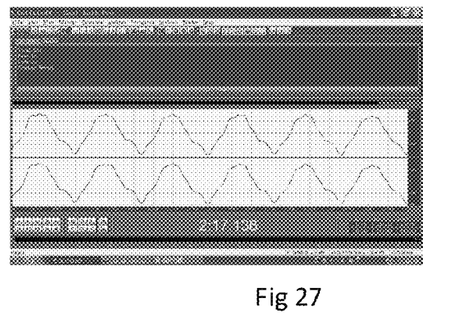
Figure 28:
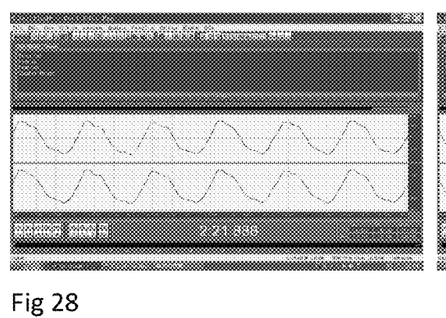
Figure 29:
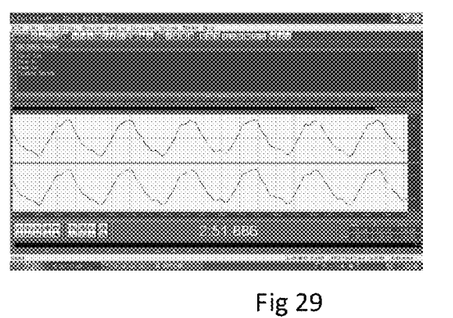
Figure 30:
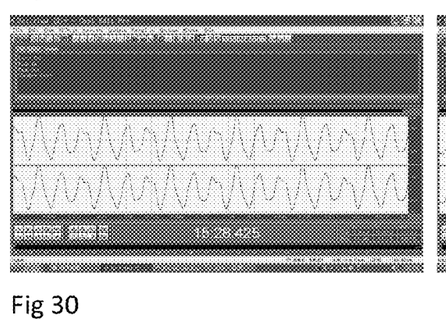
FIG. 30 to FIG. 33 is G string frequency spectrum of A type.
Figure 31:
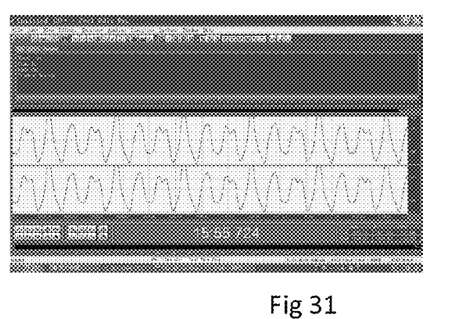
Figure 32:
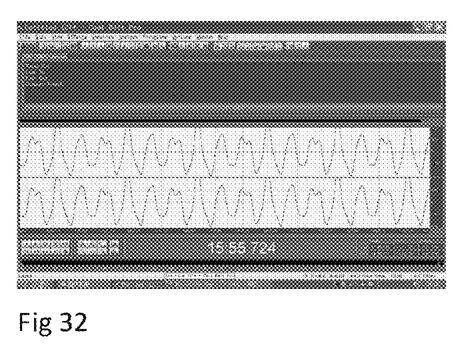
Figure 33:
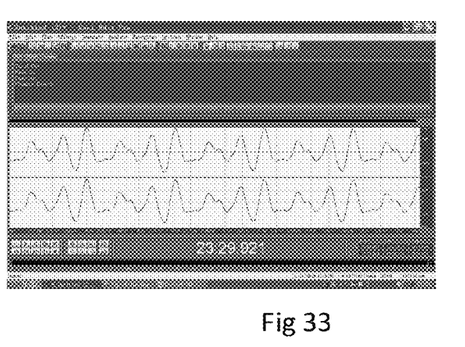
Figure 34:
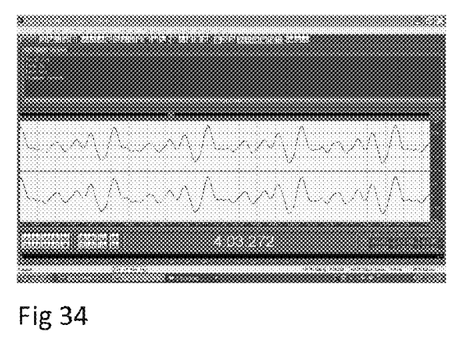
FIG. 34 to FIG. 37 is G string frequency spectrum of B type.
Figure 35:
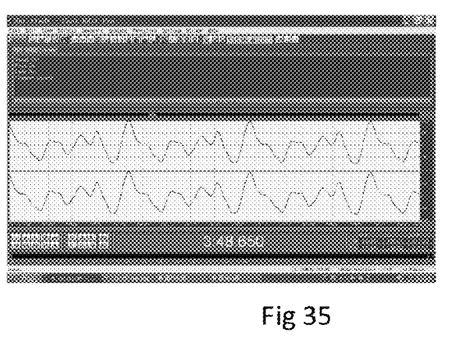
Figure 36:
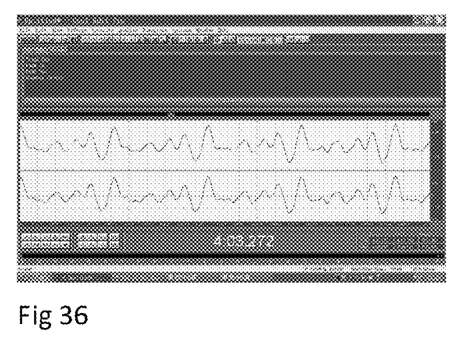
Figure 37:
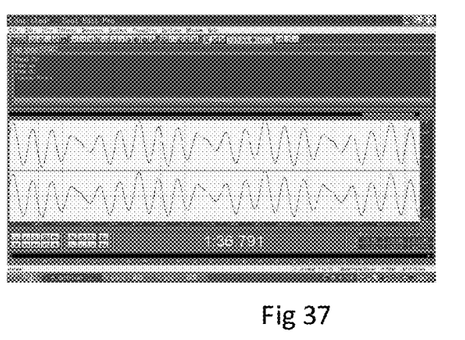

In order to improve voice of violin bass, low beam install low frequency reflecting surface, as shown in FIG. 4 and FIG. 5, FIG. 3 is a reflecting surface, also is Elastic slice with a fixed wooden 2 connected to the bass beam of side, elastic slice is parallel to inner surface of faceplate and maintained close distance, should be avoid touch to faceplate, the elastic slice on the shape should avoid the channel of voice and without obstruct the sound column installation, the distance between low frequency reflective slice and faceplate inner surface should be greater than 0.2 mm and less than 0.4 mm, elastic slice of thickness should be good elasticity.

The embodiment of the violin configuration and making method is also suitable for viola and cello.

All characteristics disclosed in the specification, all the disclosed methods or steps of processes can be combined in any manner, except mutually exclusive characteristics and/or steps.

Any one of the characteristics disclosed in this specification (including any additional claim, abstract and accompany drawings), unless particularly described, all can be replaced with other equivalents or alternative characteristics with similar purposes. That is, unless particularly described, each feature is just one example among a series of equivalents or similar features.

The invention is not limited to the aforementioned embodiments. The invention extends to any disclosed new feature or any new combination thereof, as well as any one of disclosed new methods, process steps or any new combination thereof in this specification.

The invention claimed is:

1. An acoustic configuration violin, comprising:
    a violin cavity comprising a backplate, a faceplate and side plates,
    the violin cavity having a head end, a tail end, and a longitudinal mid-section between the head end and the tail end,
    a side of the cavity having a c-shaped region, and
    an f-hole being set on the faceplate, wherein:
    in the longitudinal mid-section of violin cavity, a vertical distance between an inner surface of the backplate and an inner surface of the faceplate is increased gradually from the head end or the tail end to the c-shaped region, farther from the C-shaped region, a rising slope of the vertical distance is smaller, and nearer to the C-shaped region, the rising slope of the vertical distance is greater, and
    a length between each of (i) the head end and the c-shaped region and (ii) the tail end and the c-shaped region is divided in twelve equal parts, and the distance between the inner surface of the backplate and the inner surface of the faceplate at a point between each divided part in order equals one of 12 tones in order having American standard pitch frequency.

2. The violin according to claim 1, wherein said violin is a fiddle.

3. The violin according to claim 1, wherein said violin is an acoustic violin.

4. An acoustic configuration string instrument, comprising:
    a string instrument cavity comprising a backplate, a faceplate and side plates,
    the string instrument cavity having a head end, a tail end, and a longitudinal mid-section between the head end and the tail end,
    a side of the cavity having a c-shaped region, and
    an f-hole being set on the faceplate, wherein:
    in the longitudinal mid-section of the string instrument cavity, a vertical distance between an inner surface of the backplate and an inner surface of the faceplate is increased gradually from the head end or the tail end to the c-shaped region, farther from the C-shaped region, a rising slope of the vertical distance is smaller, nearer to the C-shaped region, the rising slope of the vertical distance is greater, a length between the head end and the c shaped region and a length between the tail end and the c shaped region is divided into 12 equal parts, a distance between the inner surface of the backplate and the inner surface of the faceplate at a point between each divided part equals one of 12 standard tone wavelengths in order having American standard pitch frequency, said 12 standard tone wavelengths defining 12 divided points respectively, and each of the 12 divided points are connected with a continuous curve to constitute a string instrument cavity inner mold line, and
    the twelve tones chosen for the distance between the inner surface of the backplate and the inner surface of the faceplate in the head end to the c-shaped region are different from the twelve tones chosen for the distance between the inner surface of the backplate and the inner surface of the faceplate in the tail end to the c-shaped region.

5. The violin according to claim 1, wherein a low frequency reflecting surface is set in the violin cavity, the low frequency reflecting surface located in a center of the cavity and avoiding the f hole, and a distance between the inner faceplate and the low frequency reflecting surface is less than 0.4 cm.

6. The violin according to claim 5, wherein said low frequency reflecting surface is set at an inner side of a bass beam of the violin.

7. A method for making a violin of acoustic configuration, comprising:
    in a longitudinally symmetrical section between a head end and a tail end in a violin cavity, dividing each of a length between the head end and a c shaped region and a length between the tail end and the c shaped region into 12 equal parts, choosing 12 standard tone wavelengths in order having American standard pitch frequency, said 12 standard tone wavelengths defining 12 divided points respectively, said 12 standard tone wavelengths being equal to a distance between an inner surface of a faceplate and an inner surface of a backplate, and
    connecting each of the twelve divided points with a continuous curve to constitute a violin cavity inner mold line.

8. The method according to claim 7, wherein
    at the head and tail ends of the violin cavity, setting the twelfth dividing point closest to the c-shaped region as an origin,
    setting a vertical axis through a longitudinal symmetrical section and the origin as a rotating axis,
    intercepting a plurality of equal radial sections at different inclination angles to the rotating axis,
    making 12 equal vertical dividing lines in the equal radial sections, and
    making the distance between the inner surfaces of the faceplate and the backplate along the equal vertical dividing lines equal to the wavelengths of the selected 12 tones respectively at the equal vertical dividing lines.

9. The violin according to claim 1, wherein the twelve tones chosen for the head end to c-shaped region are different from the twelve tones chosen for the tail end to c-shaped region.

10. The violin according to claim 2, wherein the twelve tones chosen for the head end to c-shaped region are different from the twelve tones chosen for the tail end to c-shaped region.

11. The violin according to claim 3, wherein the twelve tones chosen for the head end to c-shaped region are different from the twelve tones chosen for the tail end to c-shaped region.

12. The string instrument according to claim 4, wherein a low frequency reflecting surface is set in the string instrument cavity, the low frequency reflecting surface located in a center of the cavity and avoiding the f hole, and a distance between an inner faceplate and the low frequency reflecting surface is less than 0.4 cm.

13. The violin according to claim 2, wherein a low frequency reflecting surface is set in the violin cavity, the low frequency reflecting surface located in a center of the cavity and avoiding the f hole, and a distance between an inner faceplate and the low frequency reflecting surface is less than 0.4 cm.

14. The violin according to claim 3, wherein a low frequency reflecting surface is set in the violin cavity, the low frequency reflecting surface located in a center of the cavity and avoiding the f hole, and a distance between an inner faceplate and the low frequency reflecting surface is less than 0.4 cm.

15. The string instrument according to claim 4, wherein said string instrument is a fiddle.

16. The string instrument according to claim 4, wherein said string instrument is a viola.

17. The string instrument according to claim 4, wherein said string instrument is a cello.

18. The string instrument according to claim 12, wherein said low frequency reflecting surface is set at an inner side of a bass beam of the string instrument.

19. The method according to claim 7, wherein
at the head and tail ends of the violin cavity, setting the twelfth dividing point closest to the c-shaped region as an origin,
setting a vertical axis through a longitudinal symmetrical section and the origin as a rotating axis,
intercepting a plurality of equal radial sections at different inclination angles to a rotation axis as a rotating axis,
making 12 equal vertical dividing lines in the equal radial sections, and
making the distance between the inner surfaces of the faceplate and the backplate along the equal vertical dividing lines equal to the wavelengths of the selected 12 tones respectively at the equal vertical dividing lines.

20. The string instrument according to claim 4, wherein said string instrument is an acoustic violin.

* * * * *